United States Patent
Daly

(10) Patent No.: US 10,263,337 B1
(45) Date of Patent: Apr. 16, 2019

(54) METHOD FOR MULTIPLE-INPUT MULTIPLE-OUTPUT COMMUNICATION USING SINGLE PORT RADIATION PATTERN RECONFIGURABLE ANTENNAS

(71) Applicant: The United States of America as represented by the Secretary of the Navy, Washington, DC (US)

(72) Inventor: Michael P. Daly, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 12 days.

(21) Appl. No.: 15/834,408

(22) Filed: Dec. 7, 2017

(51) Int. Cl.
| | |
|---|---|
| *H01Q 3/26* | (2006.01) |
| *H01Q 25/00* | (2006.01) |
| *H01Q 5/385* | (2015.01) |
| *H04B 7/0413* | (2017.01) |

(52) U.S. Cl.
CPC .......... *H01Q 5/385* (2015.01); *H01Q 3/2629* (2013.01); *H01Q 25/002* (2013.01); *H04B 7/0413* (2013.01)

(58) Field of Classification Search
CPC ..... H01Q 5/385; H01Q 3/2629; H01Q 25/002
USPC .......................................... 343/703; 375/267
See application file for complete search history.

(56) References Cited

U.S. PATENT DOCUMENTS

| | | | | |
|---|---|---|---|---|
| 7,330,152 | B2* | 2/2008 | Zhang | H01Q 3/24 343/700 MS |
| 9,263,798 | B1* | 2/2016 | Piazza | H01Q 3/446 |
| 9,972,905 | B2* | 5/2018 | Schaffner | H01Q 21/065 |
| 10,056,689 | B2* | 8/2018 | Lee | H01Q 3/446 |
| 2013/0249761 | A1* | 9/2013 | Loh | H01Q 3/242 343/833 |
| 2015/0236408 | A1* | 8/2015 | Kona | H01Q 1/523 343/750 |
| 2015/0340770 | A1* | 11/2015 | Loh | H01Q 3/30 343/833 |
| 2015/0349418 | A1* | 12/2015 | Patron | H01Q 3/24 343/836 |
| 2018/0062257 | A1* | 3/2018 | Kausar | H01Q 3/26 |

* cited by examiner

*Primary Examiner* — Lam T Mai
(74) *Attorney, Agent, or Firm* — NIWC Pacific; Kyle Eppele

(57) ABSTRACT

An aspect of the present invention is drawn to a communication system that includes an electrically steerable parasitic array transmitter antenna, a transmitter driver, an electrically steerable parasitic array receiver antenna, and a receiver driver. The transmitter driver is arranged such that it is operable to enable the electrically steerable parasitic array transmitter antenna to transmit a beam having a first directional vector at a first time, a second directional vector at a second time, and an $n^{th}$ directional vector at an $n^{th}$ time. The receiver driver is arranged such that it is operable to enable the electrically steerable parasitic array receiver antenna to receive a beam having a third directional vector at a third time, a fourth directional vector at a fourth time, and an $m^{th}$ directional vector at an $m^{th}$ time.

20 Claims, 9 Drawing Sheets

METHOD FOR MULTIPLE-INPUT MULTIPLE-OUTPUT COMMUNICATION USING SINGLE PORT RADIATION PATTERN RECONFIGURABLE ANTENNAS

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 3600, San Diego, Calif., 92152; telephone (619)553-5118; email: ssc_pac_t2@navy.mil. Reference Navy Case No. 103,381.

BACKGROUND OF THE INVENTION

The present invention generally relates to using antennas to enable multiple input and multiple output (MIMO) communications.

There exists a need for a device and method to enable MIMO communications with a minimum amount of antennas used in the transmitter and receiver.

SUMMARY OF THE INVENTION

An aspect of the present invention is drawn to a communication system that includes an electrically steerable parasitic array transmitter antenna, a transmitter driver, an electrically steerable parasitic array receiver antenna, and a receiver driver. The transmitter driver is arranged such that it is operable to enable the electrically steerable parasitic array transmitter antenna to transmit a beam having a first directional vector at a first time, a second directional vector at a second time, and an $n^{th}$ directional vector at an $n^{th}$ time. The receiver driver is arranged such that it is operable to enable the electrically steerable parasitic array receiver antenna to receive a beam having a third directional vector at a third time, a fourth directional vector at a fourth time, and an $m^{th}$ directional vector at an $m^{th}$ time.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION

Aspects of the present invention are drawn to a system and method for using an electrically steerable parasitic array transmitter antenna to enable MIMO communications.

Traditionally, MIMO communications requires using multi-antenna systems for the transmitter and receiver. This requires multiple radio frequency (RF) chains connecting each antenna in the transmitting or receiving array. Using multiple RF chains increases system size, cost, complexity, and power usage.

In accordance with aspects of the present invention, the antenna arrays of the transmitter and receiver of a MIMO communication system are replaced with a single antenna. These antennas have the capability of modifying how they direct and receive radiation, and are known as radiation pattern-reconfigurable antennas.

By using a transmitter driver to rapidly reconfigure the antenna pattern combined with judicious selection of transmitted symbols, the far field radiation of the transmitter is made to be the same as a traditional multi-antenna MIMO transmit array.

A receiver driver can then be used to repeatedly reconfigure the receiver antenna radiation pattern faster than the symbol rate in order to receive signals from multiple channels using a single receiver.

Aspects of the present invention will now be described with reference to FIGS. 1-7.

Figure 1:
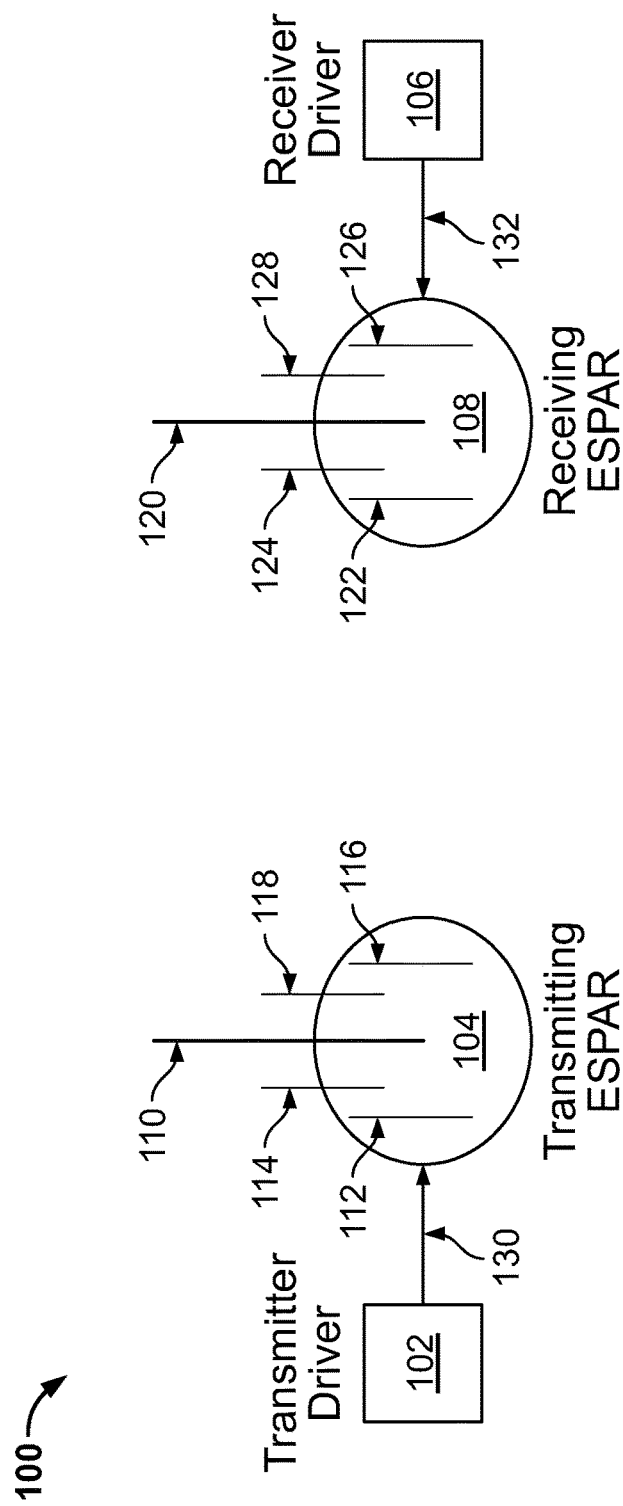
FIG. 1 illustrates a block diagram of a MIMO communication system in accordance with aspects of the present invention.

FIG. 1 illustrates a MIMO communication system 100 in accordance with aspects of the present invention.

As illustrated in the figure, MIMO communication system 100 includes a transmitter driver 102, a transmitting electrically steerable parasitic array antenna (ESPAR) 104, a receiver driver 106, and a receiving ESPAR 108. Transmitting ESPAR 104 further includes an active transmitting antenna 110, a parasitic element 112, a parasitic element 114, a parasitic element 116, and a parasitic element 118. Receiving ESPAR 108 further includes an active receiving antenna 120, a parasitic element 122, a parasitic element 124, a parasitic element 126, and a parasitic element 128.

Transmitter driver 102 may be any device or system that is operable to provide a transmitter driving signal to transmitting ESPAR 104, via line 130.

Receiver driver 106 may be any device or system that is operable to provide a receiver driving signal to receiving ESPAR 108, via line 132.

Transmitting electrically steerable parasitic array antenna (ESPAR) 110 may be any device or system that is operable to transmit a signal along a directional vector based on the total impedance of parasitic element 112, parasitic element 114, parasitic element 116, and parasitic element 118. It should be noted that in this non-limiting example embodiment, four parasitic elements are used in transmitting ESPAR 110. However, any number of parasitic elements may be used in a transmitting ESPAR in accordance with aspects of the present invention.

An ESPAR includes one feed radiating element and a plurality of parasitic radiating elements placed in the near field of the active radiator. A beam is formed due to spatial electromagnetic field coupling among radiating elements. The radiation pattern is electronically controlled by way of variable impedance devices loading the parasitic elements. Unlike a conventional phased array, only one transmitter and receiver are needed for system configuration.

Receiving ESPAR 108 may be any device or system that is operable to receive a signal along a directional vector based on the total impedance of parasitic element 122, parasitic element 124, parasitic element 126, and parasitic element 128. It should be noted that in this non-limiting example embodiment, four parasitic elements are used in receiving ESPAR 108. However, any number of parasitic elements may be used in a receiving ESPAR in accordance with aspects of the present invention.

Parasitic element 112, parasitic element 114, parasitic element 116, and parasitic element 118 each may be any device or system that is operable to change respective impedance based on the transmitter driving signal provided by transmitter driver 102, via line 130. For example, a parasitic element may be an electrically conducting protrusion that is electrically connected to an impedance element or combination of impedance elements, such as resistors, capacitors and inductors.

Parasitic element 122, parasitic element 124, parasitic element 126, and parasitic element 128 each may be any device or system that is operable to change respective impedance based on the receiver driving signal provided by receiver driver 102, via line 132.

In operation, transmitter driver 102 will begin by providing a transmitter driver signal to transmitting ESPAR 104, via line 130. Once transmitting ESPAR 104 receives the transmitter driver signal, each of parasitic element 112, parasitic element 114, parasitic element 116, and parasitic element 118 will change their impedance based on the transmitter driver signal. The total impedance of each parasitic element of transmitting ESPAR 104 affects the directional vector in which transmitting ESPAR 104 transmits a signal.

Simultaneously, receiver driver 106 provides a receiver driver signal to receiving ESPAR 108, via line 132. Similar to the operation of transmitting ESPAR 104, each of parasitic element 122, parasitic element 124, parasitic element 126, and parasitic element 128 will change their impedance based on the receiver driver signal. The total impedance of each parasitic element of receiving ESPAR 108 affects the directional vector in which receiving ESPAR 108 receives a signal.

In this example embodiment, the directional vector in which transmitting ESPAR 104 transmits a signal corresponds to the directional vector in which receiving ESPAR 108 receives a signal. In this manner, the correspondence between the directional vectors of transmitting ESPAR 104 and receiving ESPAR 108 creates a virtual channel over which data may be transmitted.

By rapidly changing the impedance of the parasitic elements, the directional vector of the transmitter antenna and receiver antenna may be reconfigured. Each time the directional vectors of the antennas are reconfigured, a new virtual channel is created, enabling MIMO communication while only using a single antenna in the transmitter and receiver.

The operation of transmitter driver 102 providing a transmitter driving signal in order to change the impedance of parasitic element 112, parasitic element 114, parasitic element 116, and parasitic element 118 will now be discussed with reference to FIG. 2A.

Figure 2A:
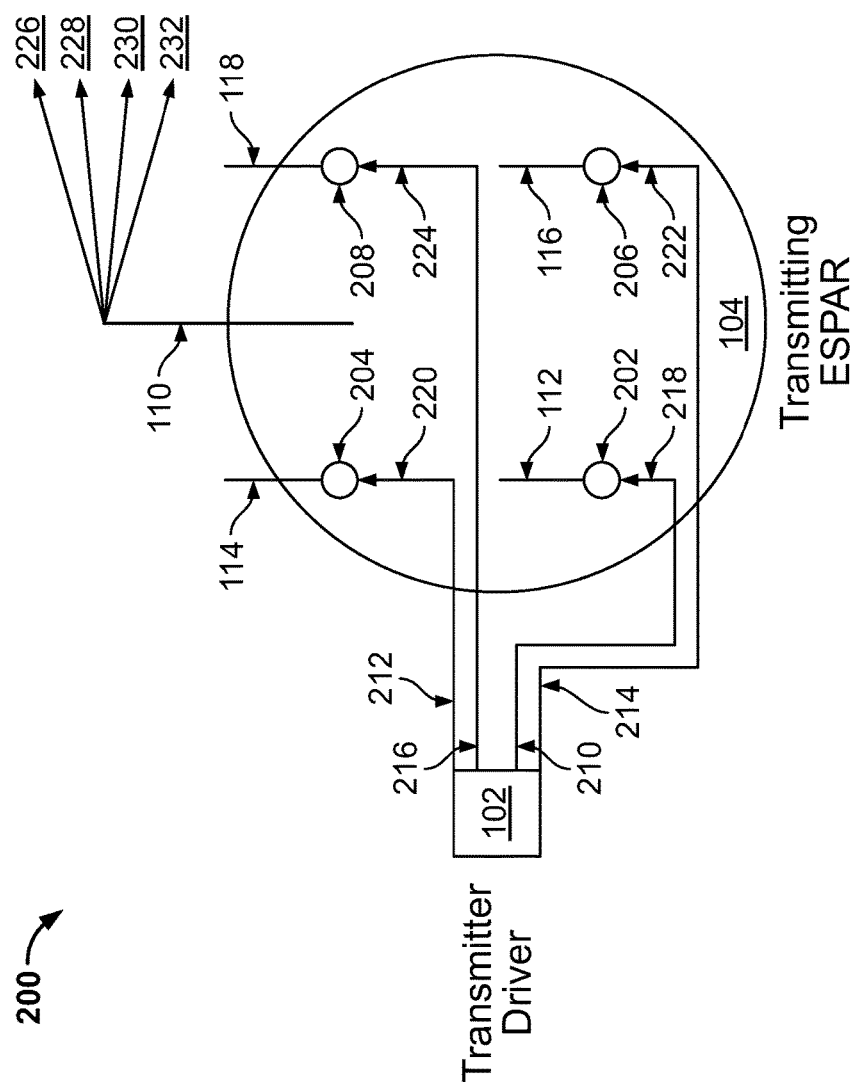
FIG. 2A illustrates a block diagram of the operation of a transmitter driver in accordance with aspects of the present invention.

FIG. 2A illustrates the operation of transmitter driver 102 in accordance with aspects of the present invention.

As shown in the figure, transmitting ESPAR 104 includes a switch 202, a switch 204, a switch 206, and a switch 208.

Transmitter driver 102 is operable to provide transmitter driver signal 218 to switch 202, via line 210, transmitter driver signal 220 to switch 204, via line 212, transmitter driver signal 222 to switch 206, via line 214, and transmitter driver signal 224 to switch 208, via line 216.

The transmitter driver signals provided by transmitter driver 102 are provided as a signal modulated with a binary phase-shift keying modulation scheme. Transmitter driver 102 is further operable to provide the transmitter driver signals at a first time in order to instruct each of switch 202, switch 204, switch 206, and switch 208 to be open, and provide the transmitter driver signals at a second time in order to instruct each of switch 202, switch 204, switch 206, and switch 208 to be closed.

Parasitic element 112 is operable to have an open state impedance when switch 202 is in an open state and to have a closed state impedance when switch 202 is in a closed state. Similarly, each of parasitic elements 114, 116 and 118 have a respective open state impedance when in an open state and have a closed state impedance when in a closed state. By modifying the states of parasitic elements 112, 114, 116 and 118, the directional vector of a signal transmitted from active transmitting element 110 is controlled. A non-limiting example of open/closed states to modify the directional vector will now be described.

Switch 202 is electrically connected to parasitic element 112 and is operable to be in an open state or a closed state based on transmitter driver signal 218. Switch 204 is electrically connected to parasitic element 114 and is operable to be in an open state or a closed state based on transmitter driver signal 220. Switch 206 is electrically connected to parasitic element 116 and is operable to be in an open state or a closed state based on transmitter driver signal 222. Switch 208 is electrically connected to parasitic element 118 and is operable to be in an open state or a closed state based on transmitter driver signal 224.

In operation, at time $t_1$ transmitter driver 102 begins by providing transmitter driver signal 218 to switch 202, via line 210, transmitter driver signal 220 to switch 204, via line 212, transmitter driver signal 222 to switch 206, via line 214, and transmitter driver signal 224 to switch 208, via line 216. For purposes of discussion, assume that the transmitter driver signals provided by transmitter driver 102 instruct switch 202 to be closed and each of switch 204, switch 206, and switch 208 to be open.

At this time, once switch 202 is closed, parasitic element 112 is able to affect the radiation pattern of transmitting ESPAR 104 such that it transmits along directional vector 226. Transmitting ESPAR 104 will transmit along directional vector 226 until time $t_2$. At time $t_2$, transmitter driver 102 will once again provide transmitter driver signals to each switch in transmitting ESPAR 104.

Suppose that at time $t_2$, the transmitter driver signals provided by transmitter driver 102 instruct switch 204 to be closed, and each of switch 202, switch 206, and switch 208 to be open. At this point, only parasitic element 114 will be able to affect the radiation pattern of active transmitting antenna 110, as such, transmitting ESPAR 104 will begin transmitting along directional vector 228.

The process of transmitter driver 102 turning off all but one switch in transmitting ESPAR 104 will continue in the manner described above. At time t$_3$, only switch 206 will be closed and transmitting ESPAR 104 will transmit along directional vector 230, and at time t$_4$ only switch 208 will be closed and transmitting ESPAR 104 will transmit along direction vector 232.

After transmitter driver 102 has turned on switch 208, the process will begin again as transmitter driver 102 instructs switch 202 to close and each of switch 204, switch 206, and switch 208 to open, enabling transmitting ESPAR 104 to begin transmitting along directional vector 226.

The above-discussed sample situation is provided merely as an example. It should be noted that one of ordinary skill in the art would recognize that many different states of open/closed switches may be used to provide predetermined directional vectors of a transmitted signal.

Receiver driver 106 provides a receiver driving signal in order to change the impedance of parasitic element 122, parasitic element 124, parasitic element 126, and parasitic element 128. The operation of receiver driver 106 will now be discussed with reference to FIG. 2B.

Figure 2B:
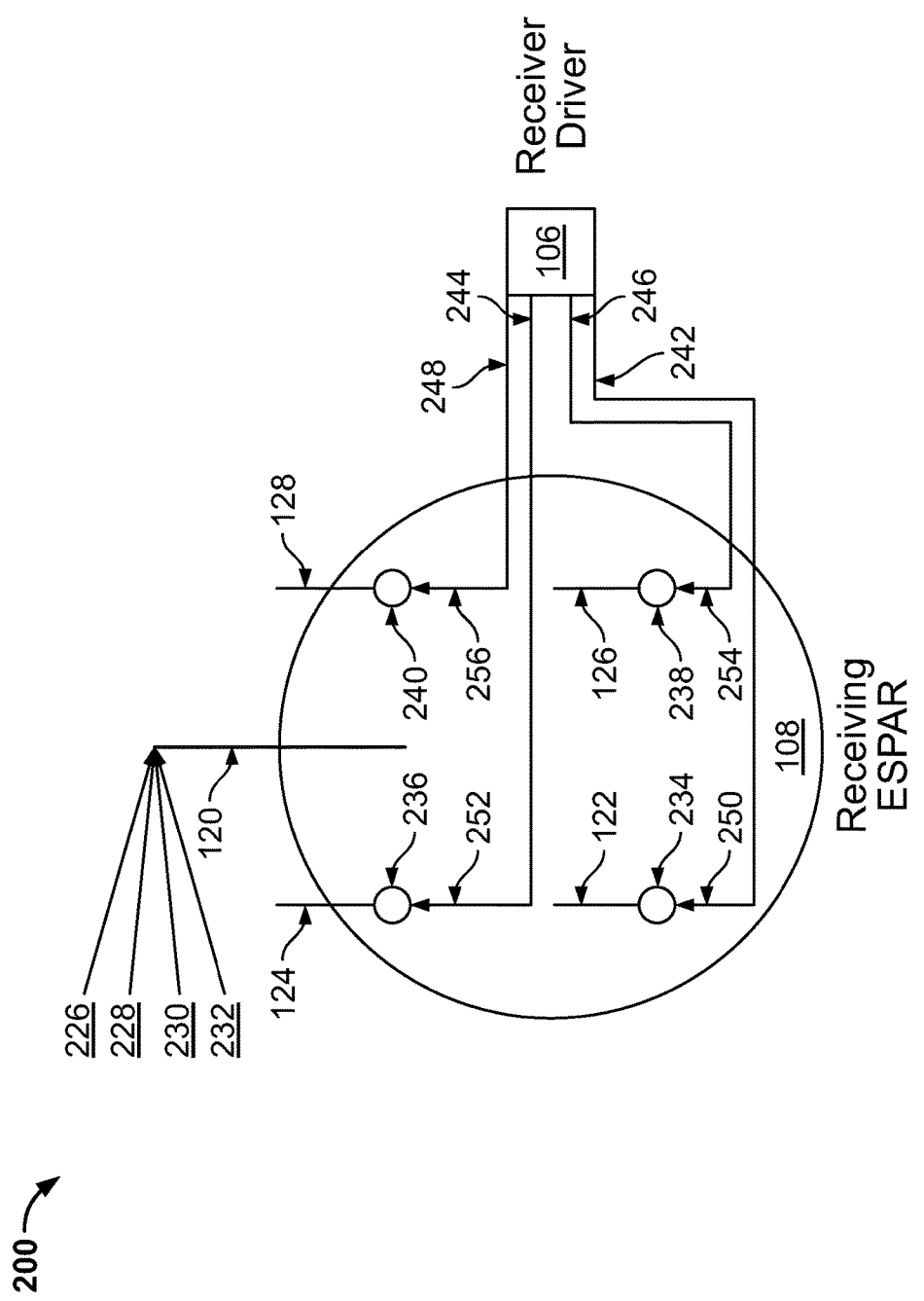
FIG. 2B illustrates a block diagram of the operation of a receiver driver in accordance with aspects of the present invention.

FIG. 2B illustrates a block diagram 200 of the operation of receiver driver 106 in accordance with aspects of the present invention.

As shown in the figure, receiving ESPAR 108 includes a switch 234, a switch 236, a switch 238, and a switch 240.

Receiver driver 106 is operable to provide receiver driver signal 250 to switch 234, via line 242, receiver driver signal 252 to switch 236, via line 244, receiver driver signal 254 to switch 238, via line 246, and receiver driver signal 256 to switch 240, via line 248.

Receiver driver 106 is additionally operable to provide the receiver driver signals at a third time, after the first time and second time of FIG. 2A, in order to instruct each of switch 234, switch 236, switch 238, and switch 240 to be open and provide the receiver driver signals at a fourth time in order to instruct each of switch 234, switch 236, switch 238, and switch 240 to be closed.

Parasitic element 122 is operable to have an open state impedance when switch 234 is in an open state and to have a closed state impedance when switch 234 is in a closed state. Similarly, each of parasitic elements 124, 126 and 128 have a respective open state impedance when in an open state and have a closed state impedance when in a closed state. By modifying the states of parasitic elements 122, 124, 126 and 128, the directional vector of a received signal at active receiving antenna 120 is controlled.

Switch 234 is electrically connected to parasitic element 122 and is operable to be in an open state or a closed state based on receiver driver signal 250. Switch 236 is electrically connected to parasitic element 124 and is operable to be in an open state or a closed state based on receiver driver signal 252. Switch 238 is electrically connected to parasitic element 126 and is operable to be in in an open state or a closed state based on receiver driver signal 254. Switch 240 is electrically connected to parasitic element 128 and is operable to be in an open state or a closed state based on receiver driver signal 256.

In operation, receiver driver 106 reconfiguring the directional vector on which receiving ESPAR 108 receives is similar to the operation of transmitter driver 102 reconfiguring the directional vector on which transmitting ESPAR 104 transmits as described above in FIG. 2A.

To begin, at time t$_1$ receiver driver 106 begins by providing receiver driver signal 250 to switch 234, via line 242, receiver driver signal 252 to switch 236, via line 244, receiver driver signal 254 to switch 238, via line 246, and receiver driver signal 256 to switch 240, via line 256. For purposes of discussion, assume that the receiver driver signals provided by receiver driver 106 instruct switch 234 to be closed and each of switch 236, switch 238, and switch 240 to be open.

At this time, once switch 234 is closed, parasitic element 122 is able to affect the radiation pattern of receiving ESPAR 108 such that it receives along directional vector 226. Active receiving antenna 120 will receive along directional vector 226 until time t$_2$. Referring back to FIG. 2A briefly, at time t$_1$, transmitting ESPAR 104 is also transmitting along directional vector 226. Returning to FIG. 2B, since receiving ESPAR 108 is also receiving along directional vector 226, a virtual channel is created between transmitting ESPAR 104 and receiving ESPAR 108 over which data is able to be transferred.

At time t$_2$, the receiver driver signals provided by receiver driver 106 instruct switch 236 to be closed, and each of switch 234, switch 238, and switch 240 to be open. With switch 236 closed, only parasitic element 124 is able to affect active receiving antenna 120 resulting in it receiving along directional vector 228. Again, as described in FIG. 2A, at time t$_2$ transmitting ESPAR 104 transmits along directional vector 228 as well, creating a new virtual channel that is distinctly separate from the previous channel.

The process of receiver driver 106 turning off all but one switch in receiving ESPAR 108 will continue in a similar manner. At time t$_3$, only switch 238 will be closed and active receiving antenna 120 will receiver along directional vector 230 and at time t$_4$ only switch 240 will be closed and active receiving antenna 120 will receive along direction vector 232. At time t$_3$ and time t$_4$, transmitting ESPAR 104 will be transmitting along the same directional vector on which receiving ESPAR 108 is receiving in order to create a new virtual channel.

In this manner, by transmitting and receiving along different directional vectors, active transmitting antenna 110 of transmitting ESPAR 104 and active receiving antenna 120 of receiving ESPAR 108 are able to act as a multiple antenna array. In FIGS. 2A-2B, only the reconfiguration of each antennas radiation pattern and directional vector have been discussed. In practice, the rate at which the antennas are reconfigured needs to be considered as well. The rate at which transmitting ESPAR 104 and receiving ESPAR 108 are reconfigured will now be discussed with reference to FIGS. 3A-7.

Figure 3A:
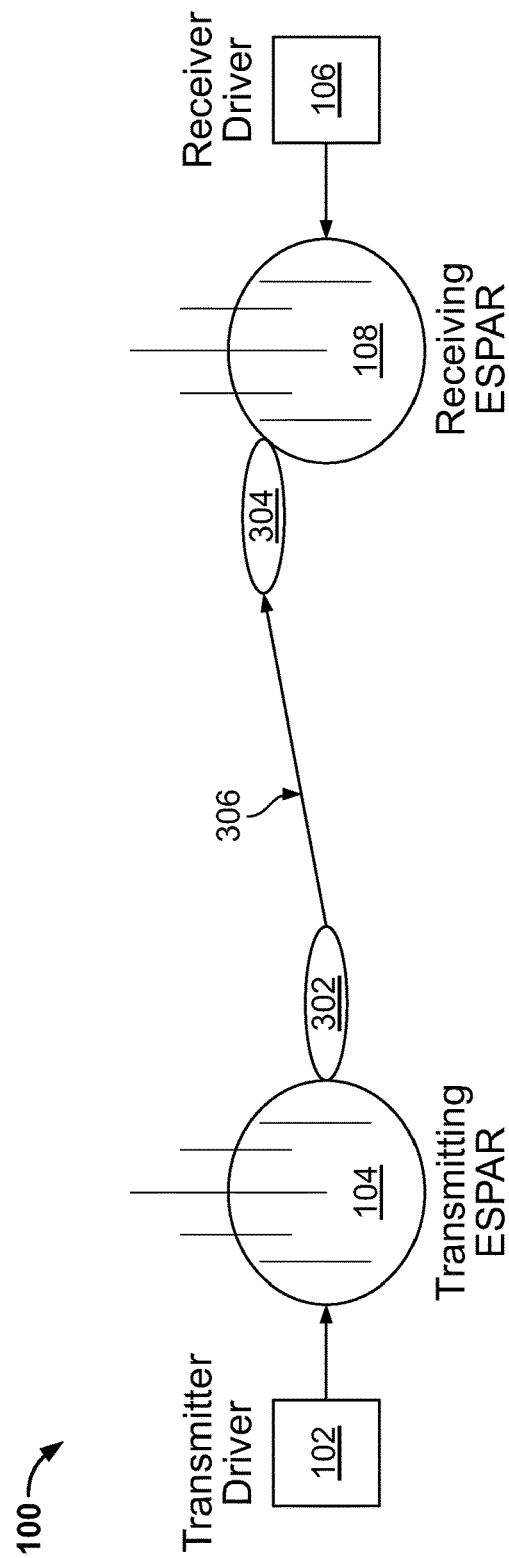
FIG. 3A illustrates a transmitter and a receiver operating along a first channel in accordance with aspects of the present invention.

FIG. 3A illustrates MIMO communication system 100, wherein transmitting ESPAR 104 and receiving ESPAR 108 communicate along a first channel in accordance with aspects of the present invention.

As illustrated in the figure, transmitting ESPAR 104 transmits along a directional vector 302, whereas receiving ESPAR 108 receives along a directional vector 304. A communication channel 306 is created between transmitting ESPAR 104 and receiving ESPAR 108 from directional vector 302 to directional vector 304.

Figure 3B:
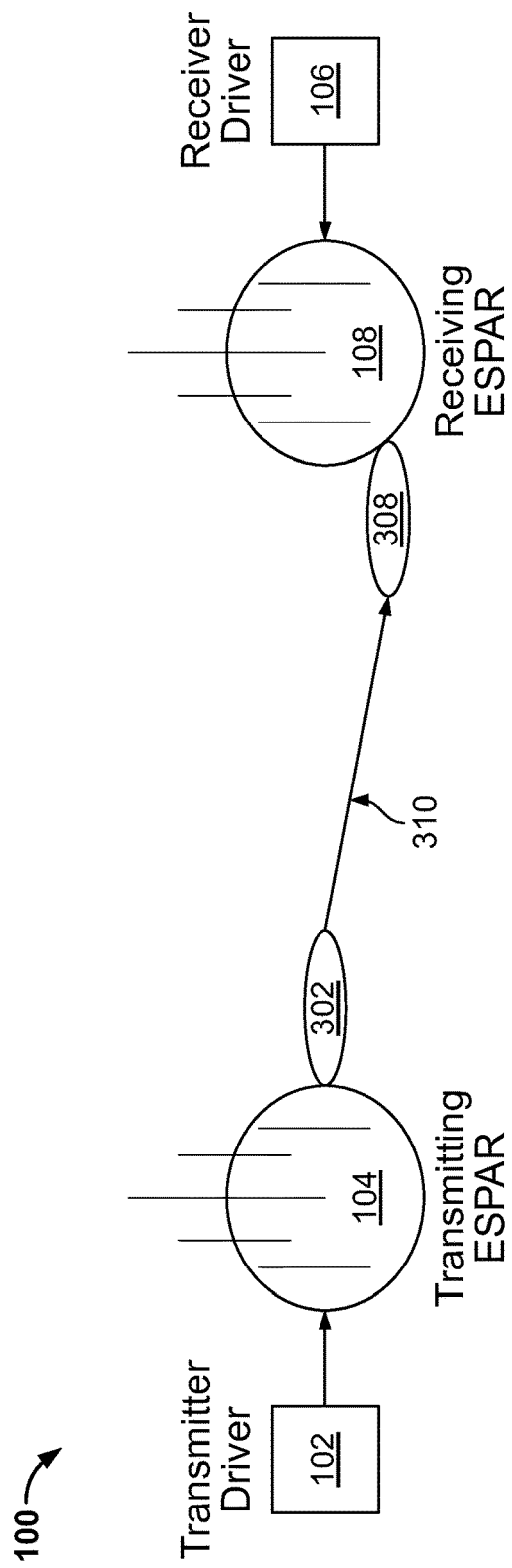
FIG. 3B illustrates a transmitter and a receiver operating along a second channel in accordance with aspects of the present invention.

FIG. 3B illustrates MIMO communication system 100, including transmitter driver 102 and receiving driver 106, wherein transmitting ESPAR 104 and receiving ESPAR 108 communicate along a second channel in accordance with aspects of the present invention.

As illustrated in the figure, transmitting ESPAR 104 transmits along directional vector 302, whereas receiving ESPAR 108 receives along a directional vector 308. A communication channel 310 is created between transmitting ESPAR 104 and receiving ESPAR 108 from directional vector 302 to directional vector 308.

In operation, transmitting ESPAR 104 is transmitting along a single fixed directional vector, which in this example embodiment is directional vector 302 and that receiving ESPAR 108 is receiving along directional vector 308. Suppose that in this example, transmitting ESPAR 104 transmitting along directional vector 302 and receiving ESPAR 108 receiving along directional vector 308, channel 310 is created. The operation of receiving ESPAR 108 switching between two directional vectors will now be described with additional reference to FIG. 4.

Figure 4:
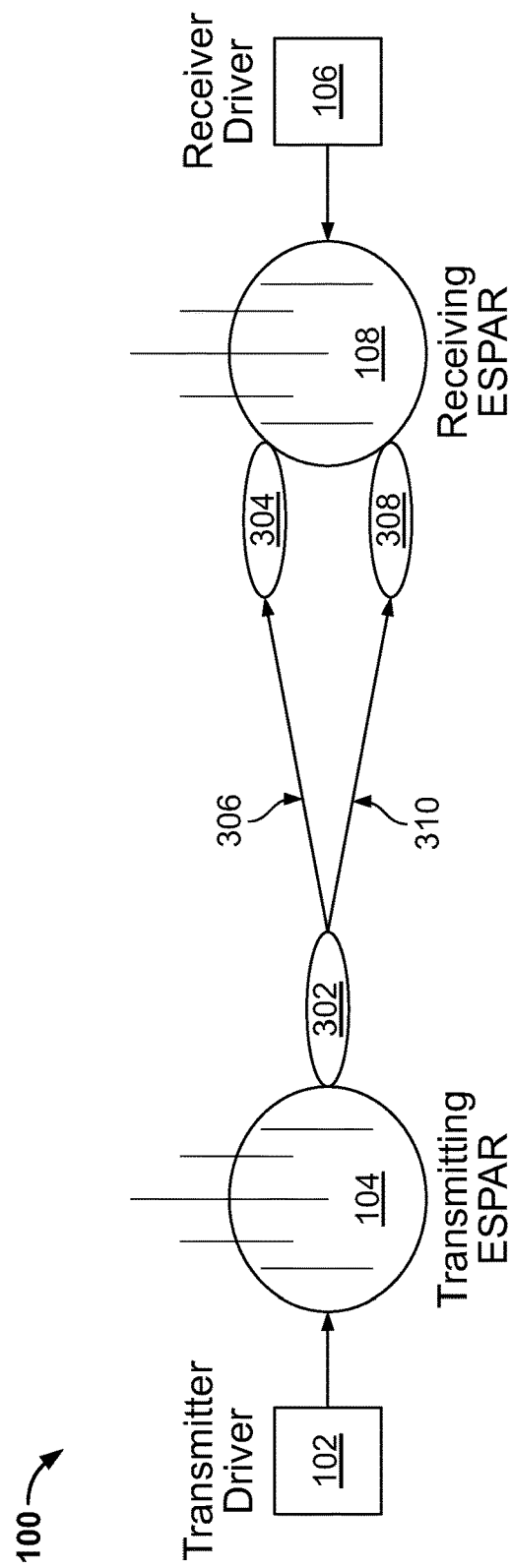
FIG. 4 illustrates the operation of a transmitter and receiver of switching between operating on a first channel and a second channel in accordance with aspects of the present invention.

FIG. 4 illustrates MIMO communication system 100, including transmitter driver 102 and receiver driver 106, wherein receiving ESPAR 108 switches between two directional vectors in accordance with aspects of the present invention.

As shown in FIG. 4, it includes all of the elements of FIG. 3A and FIG. 3B. For purposes of brevity, their operation will not be discussed again.

In operation, transmitting ESPAR 104 is transmitting along a single fixed directional vector, which in this example embodiment is directional vector 302 and that receiving ESPAR 108 is receiving along either directional vector 304 or directional vector 308. In this example embodiment, assume that receiver driver 106 is instructing receiving ESPAR 108 to repeatedly switch between receiving along directional vector 304 and directional vector 308. The rate at which receiving ESPAR 108 switches between directional vectors is a multiple of the symbol rate at which transmitting ESPAR 104 is transmitting.

Due to the fast switching between directional vector 304 and directional vector 308, the waveform transmitted by transmitting ESPAR 104 reaches receiving ESPAR 108 over channel 306 at half the symbol time and the other half of the time, the waveform reaches receiving ESPAR 108 over channel 310. Since the dwell time is less than the symbol period, a received symbol over channel 306 and channel 310 has a fraction of the total symbol power. This is equivalent to having multiple fixed receiver antennas whose channels are attenuated by the same fractional loss in symbol power. In this manner, receiving ESPAR 108 is able to emulate a receiving array with multiple fixed antennas.

The operation of transmitting ESPAR 104 transmitting in multiple directional vectors and receiving ESPAR 108 receiving in multiple directional vectors will now be described with reference to FIG. 5.

Figure 5:
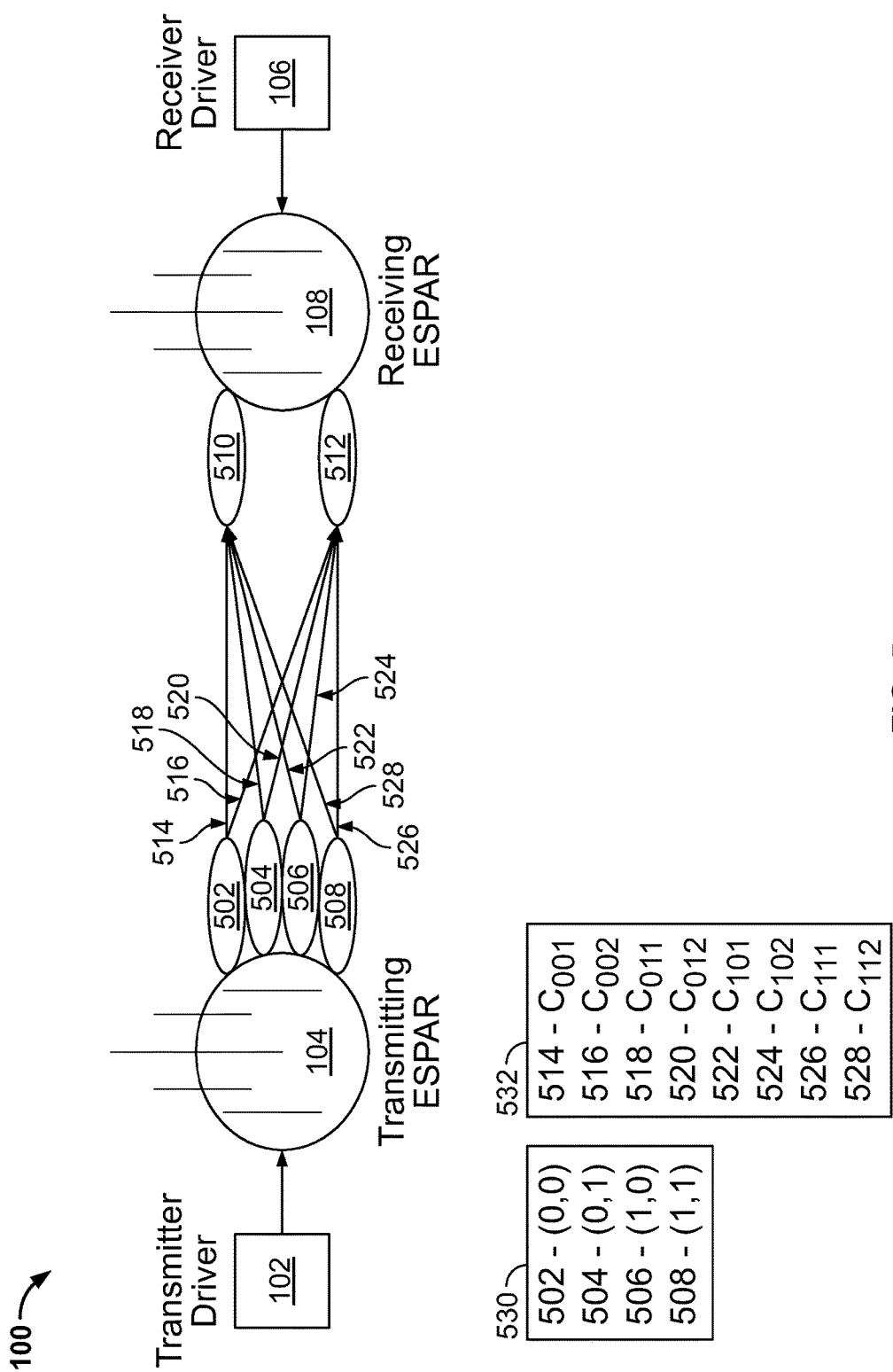
FIG. 5 illustrates a transmitter and receiver each operating using multiple direction vectors in accordance with aspects of the present invention.

FIG. 5 illustrates MIMO communication system 100, wherein transmitting ESPAR 104 and receiving ESPAR 108 each operating on multiple directional vectors in accordance with aspects of the present invention.

As shown in the figure, in MIMO communication system 100, transmitter driver 102 drives transmitting ESPAR 104 so as to provide a directional vector 502, a directional vector 504, a directional vector 506, a directional vector 508. Further, receiver driver 106 drives receiving ESPAR 108 so as to provide a directional vector 510 and a directional vector 512.

In this example a communication channel 514 is created between directional vector 502 and directional vector 510; a communication channel 516 is created between directional vector 502 and directional vector 512; a communication channel 518 is created between directional vector 504 and directional vector 510; a communication channel 520 is created between directional vector 504 and directional vector 512; a communication channel 522 is created between directional vector 506 and directional vector 510; a communication channel 524 is created between directional vector 506 and directional vector 512; a communication channel 526 is created between directional vector 508 and directional vector 510; and a communication channel 528 is created between directional vector 508 and directional vector 512.

Table 530 represents the symbols that are transmitted when transmitting ESPAR 104 is transmitting along a particular directional vector. In this example embodiment, the symbol (0,0) represents directional vector 502, the symbol (0,1) represents directional vector 504, the symbol (1,0) represents directional vector 506, and the symbol (1,1) represents directional vector 508.

Table 532 represents the symbol and channel used in transmission. The first two subscripts in each entry of table 532 represent the transmitted symbol as described above in reference to the discussion of table 530. The third subscript in table 532 represents which directional vector a transmission is received on, which is either a 1 for a first directional vector or a 2 for a second directional vector. In this example embodiment, the first directional vector corresponds to directional vector 510 and the second directional vector corresponds to directional vector 512.

Suppose that the symbols in table 530 that are transmitted by transmitting ESPAR 104 correspond to the bits that need to be sent to receiving ESPAR 108 along either of directional vector 510 or directional vector 512.

In operation, transmitter driver 102 is instructing transmitting ESPAR 104 to switch between transmitting along each of directional vector 502, directional vector 504, directional vector 506, and directional vector 508 at the symbol rate in a fashion similar to that described above in FIG. 4. Additionally, receiver driver 106 is instructing receiving ESPAR 108 to switch between receiving along directional vector 510 and directional vector 512 as described above in FIG. 4.

At some time, suppose that a 0 bit needs to be transmitted so that it is received along directional vector 510 and that a 1 bit needs to be transmitted so that it is received along directional vector 512. In this case, a 0 bit and a 1 bit corresponds to the symbol (0,1) and directional vector 504 of table 530. In this example embodiment, the symbol (0,1) is needs to be transmitted along directional vector 504 such that it is received by receiving ESPAR 108 along its second directional vector.

Transmitting the symbol (0,1) so that it is received along the second directional vector of receiving ESPAR 108 results in a subscript of (0,1,2). Using this subscript, it can be seen from table 532 that the symbol needs to be transmitted when transmitting ESPAR 104 is configured such that it is transmitting along channel 520. In this manner, from the perspective of receiving ESPAR 108, the transmission sent by transmitting ESPAR 104 looks exactly the same as if transmitting ESPAR 104 had multiple physically separated antennas that transmit over different channels composing a virtual channel matrix.

At this time, receiving ESPAR 108 needs to process the incoming signals, which will now be described with additional reference to FIG. 6.

Figure 6:
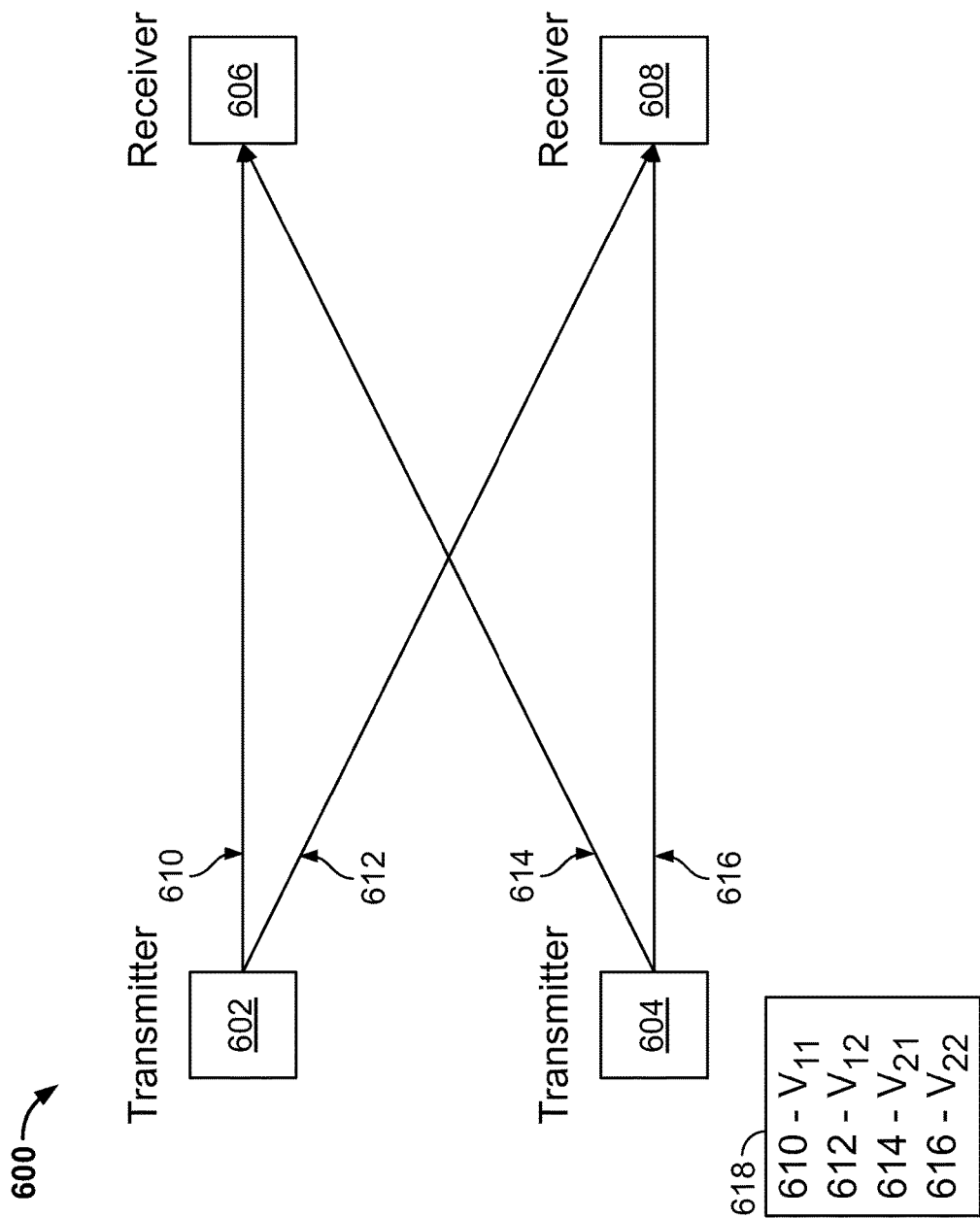
FIG. 6 illustrates a virtual channel matrix used by a receiver to process incoming signals in accordance with aspects of the present invention.

FIG. 6 illustrates a MIMO communication system 600, wherein a virtual channel matrix is used by receiving ESPAR 108 to process incoming signals in accordance with aspects of the present invention.

As shown in the figure, MIMO communication system 600 includes a transmitter 602, a transmitter 604, a receiver 606, a receiver 608, a channel 610, a channel 612, a channel 614, a channel 616, and a table 618.

Transmitter 602 is operable to transmit to receiver 606 along virtual channel 610 and to transmit to receiver 608 along virtual channel 612. Transmitter 604 is operable to transmit to receiver 606 along virtual channel 614 and to transmit to receiver 608 along virtual channel 616.

Receiver 606 is operable to receive transmissions along virtual channel 610 and virtual channel 614. Receiver 608 is operable to receive transmissions along virtual channel 612 and virtual channel 616.

Table 618 represents the symbols that correspond to transmitter 602 and transmitter 604 transmitting to either of receiver 606 or receiver 608. In this example embodiment, the symbol $V_{11}$ represents virtual channel 610, $V_{12}$ represents virtual channel 612, $V_{21}$ represents virtual channel 614, and $V_{22}$ represents virtual channel 616.

Referring back to FIG. 5, once received, receiving ESPAR 108 needs to process the transmission. To do this, since from the perspective of receiving ESPAR 108, the transmission sent by transmitting ESPAR 104 looks exactly the same as if transmitting ESPAR 104 had multiple physically separated antennas that transmit over different channels composing a virtual channel matrix as shown in FIG. 6.

Suppose that binary phase shift keying (BPSK) is used by transmitting ESPAR 104 in order to transmit data to receiving ESPAR 108. In this case, the following equations may be used to process the data, using the symbols transmitted in FIG. 5 in conjunction with the channel symbols of FIG. 6.

$$(0,0)*C_{001} = \pm V_{11} + V_{21} \quad \text{(Eq. 1)}$$

$$(0,0)*C_{002} + V_{12} + V_{22} \quad \text{(Eq. 2)}$$

$$(0,1)*C_{011} = \pm V_{11} - V_{21} \quad \text{(Eq. 3)}$$

$$(0,1)*C_{012} = \pm V_{12} - V_{22} \quad \text{(Eq. 4)}$$

$$(1,0)*C_{101} = -V_{11} + V_{21} \quad \text{(Eq. 5)}$$

$$(1,0)*C_{102} = -V_{12} + V_{22} \quad \text{(Eq. 6)}$$

$$(1,1)*C_{111} = -V_{11} - V_{21} \quad \text{(Eq. 7)}$$

$$(1,1)*C_{112} = -V_{12} - V_{22} \quad \text{(Eq. 8)}$$

Take the case when a 0 bit is sent to each receiver. The 0 bit corresponds to a +1 BPSK symbol. The virtual transmit antennas each send a +1 and this is multiplied by the respective channels to the two receiver antennas. The first receiver antennal sees a +1 from each transmitter so the actual symbol seen due to channel effects is $+V_{11}+V_{21}$.

Similarly, the second receiver antenna sees a +1 from each transmitter which combined through their channels becomes $+V_{12}+V_{22}$. Since the transmitter actually only has a single antenna, it must transmit a symbol so that it looks to the receiver antennas like +1 came over both virtual channels. Thus, the transmitted symbol and beam used must satisfy both (Eq. 1) and (Eq. 2).

If instead of BPSK, any M-ary modulation is desired, (Eq. 1)-(Eq. 8) are slightly altered. Let the M modulation symbols go from $M_1$ to $M_M$, and the virtual channels V remain the same. The physical channel corresponding to the beam used for a certain pair of symbols is $H_{aRX}$, where a goes from 1 to $M^2$ denoting all possible pairs of symbols and RX denotes one of the two receivers. A pair of symbols means one symbol is meant for the first receiver and the second symbol is meant for the second receiver. Let $S_a$ be the symbol transmitted corresponding to the beam $H_{aRX}$ used for the pair of symbols a. Then, the equations to be satisfied are as follows.

$$S_1 H_{11} = M_1 V_{11} + M_1 V_{21} \quad \text{(Eq. 9)}$$

$$S_2 H_{21} = M_1 V_{11} + M_2 V_{21} \quad \text{(Eq. 10)}$$

$$S_{(M-1)^2} H_{(M-1)1}^2 = M_M V_{11} + M_{(M-1)}^2 V_{21} \quad \text{(Eq. 11)}$$

$$S_{(M)}^2 H_{(M)1}^2 = M_M V_{11} + M_M V_{21} \quad \text{(Eq. 12)}$$

$$S_1 H_{12} = M_1 V_{11} + M_1 V_{22} \quad \text{(Eq. 13)}$$

$$S_2 H_{22} = M_1 V_{11} + M_2 V_{22} \quad \text{(Eq. 14)}$$

$$S_{(M-1)^2} H_{(M-1)2}^2 = M_M V_{12} + M_{(M-1)}^2 V_{22} \quad \text{(Eq. 15)}$$

$$S_{(M)}^2 H_{(M)2}^2 = M_M V_{12} + M_M V_{22} \quad \text{(Eq. 16)}$$

In order to implement this transmission framework, a virtual channel is selected and a set of beams and symbols that satisfy the above equations is found. The above framework applies to any single-carrier modulation which can be used for MIMO communications schemes such as Alamouti and Vertical Bell Laboratories Layered Space Time (VBLAST) architectures.

A MIMO communication system with a transmitter operating with n directional vectors and a receiver operating with m directional vectors will now be described with reference to FIG. 7.

Figure 7:
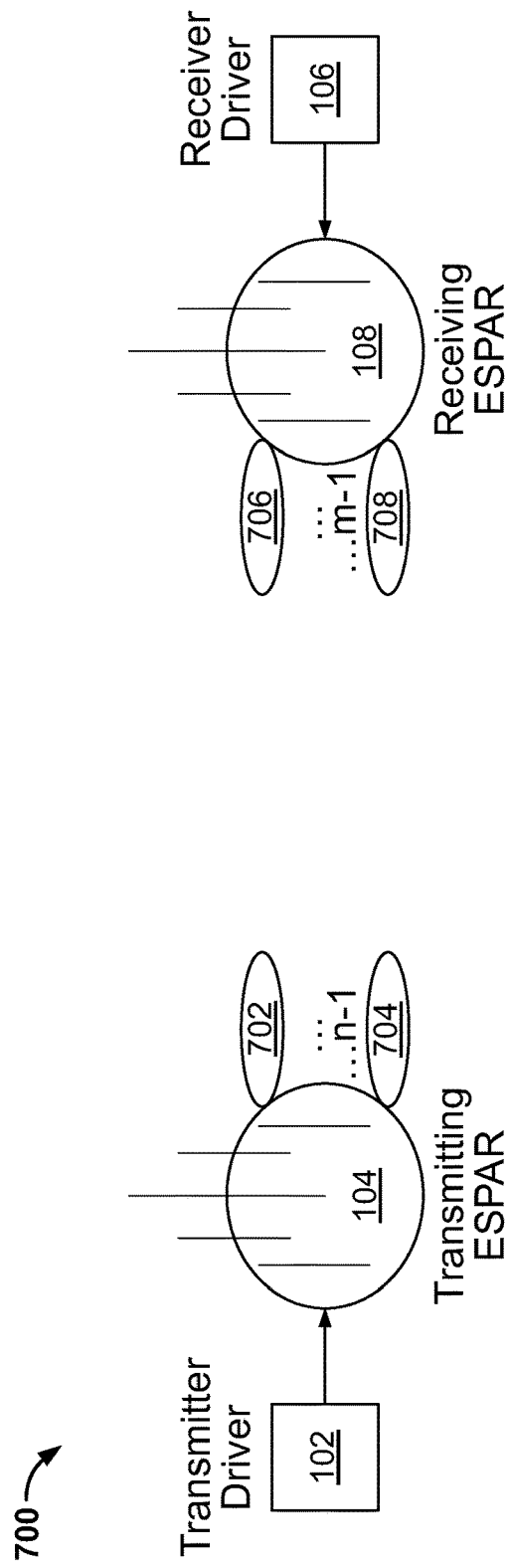
FIG. 7 illustrates a transmitter operating with n directional vectors and a receiver operating with m directional vectors in accordance with aspects of the present invention.

FIG. 7 illustrates a MIMO communication system 700, wherein a transmitter transmitting along n directional vectors and a receiver receiving along m directional vectors.

As shown in the figure, MIMO communication system 700 includes transmitter driver 102, transmitting ESPAR 104, receiver driver 106, receiving ESPAR 108, a directional vector 702, a directional vector 704, a directional vector 706, and a directional vector 708.

In operation, transmitting ESPAR 104 may operate by transmitting along n directional vectors and receiving ESPAR 108 may receive along m directional vectors. In this example embodiment, suppose that n=4 and that m=8. In this case, a total of 32 virtual channels are created between transmitting ESPAR 104 and receiving ESPAR 108. In other example embodiments, the number of n directional vectors used by transmitting ESPAR 104 and m directional vectors used by receiving ESPAR 108 may be chosen to satisfy the required number of channels.

In summary, traditional MIMO communication systems require the use of multiple antennas in the transmitter and receiver for each new channel that is desired. The use of antenna arrays increases system size, cost, complexity, and power usage.

The present invention solves this problem by using a single antenna along with multiple parasitic elements in the transmitter and receiver of a MIMO communication system. By using a driver to modify the impedance of the parasitic elements associated with each antenna, the radiation pattern of the antenna may be reconfigured.

In this manner, the rapid reconfiguration of the radiation pattern of the transmitter and receiver antennas allow them to act as a multi-antenna array that are used in traditional MIMO communication systems. Combining the radiation pattern reconfiguration of the antennas with judicious selection of the transmitted symbols, a MIMO communication system may be implemented with the use of a single antenna in each of the transmitter and receiver.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A communication system comprising:
an electrically steerable parasitic array transmitter antenna;
a transmitter driver operable to
provide, at a first time, a first transmitter driving signal to said electrically steerable parasitic array transmitter antenna so as to enable said electrically steerable parasitic array transmitter antenna to transmit a first electromagnetic field as a first transmitted beam having a first directional vector, and
provide, at a $n^{th}$ time, a $n^{th}$ transmitter driving signal to said electrically steerable parasitic array transmitter antenna so as to enable said electrically steerable parasitic array transmitter antenna to transmit a $n^{th}$ electromagnetic field as a $n^{th}$ transmitted beam having a $n^{th}$ directional vector;
an electrically steerable parasitic array receiver antenna; and
a receiver driver operable to
provide, at a third time, a first receiver driving signal to said electrically steerable parasitic array receiver antenna so as to enable said electrically steerable parasitic array receiver antenna to receive the first electromagnetic field as the first transmitted beam having the first directional vector,
provide, at a fourth time, a second receiver driving signal to said electrically steerable parasitic array receiver antenna so as to enable said electrically steerable parasitic array receiver antenna to receive a second electromagnetic field as a second transmitted beam having a second directional vector, and
provide, at a $m^{th}$ time, a $m^{th}$ receiver driving signal to said electrically steerable parasitic array receiver antenna so as to enable said electrically steerable parasitic array receiver antenna to receive an $m^{th}$ electromagnetic field as an $m^{th}$ transmitted beam having an $m^{th}$ directional vector,
wherein n is a positive integer greater than 1,
wherein m is a positive integer, and
wherein n≤m.

2. The communication system of claim 1,
wherein n=4, and
wherein m=8.

3. The communication system of claim 2, wherein said transmitter driver is operable to provide, at the first time, the first transmitter driving signal as a signal modulated with a binary phase-shift keying modulation scheme.

4. The communication system of claim 3, wherein said electrically steerable parasitic array transmitter antenna comprises a feed radiating element and a plurality of parasitic radiating elements disposed in a near field of said feed radiating element.

5. The communication system of claim 4,
wherein said electrically steerable parasitic array transmitter antenna further comprises a plurality of impedance elements and a plurality of switches,
wherein said plurality of switches are operable to be in a closed state or an open state,
wherein each of said plurality of switches are electrically connected to a respective one of said plurality of parasitic radiating elements,
wherein each of said plurality of switches are additionally connected to a respective one of said plurality of impedance elements,
wherein in the closed state, each of said plurality of switches are operable to electrically connect a respective one of said plurality of parasitic radiating elements to a respective one of said plurality of impedance elements, and
wherein in the open state, each of said plurality of switches are operable to electrically disconnect a respective one of said plurality of parasitic radiating elements to a respective one of said plurality of impedance elements.

6. The communication system of claim 1, wherein said transmitter driver is operable to provide, at the first time, the first transmitter driving signal as a signal modulated with a binary phase-shift keying modulation scheme.

7. The communication system of claim 6, wherein said electrically steerable parasitic array transmitter antenna comprises a feed radiating element and a plurality of parasitic radiating elements disposed in a near field of said feed radiating element.

8. The communication system of claim 7,
wherein said electrically steerable parasitic array transmitter antenna further comprises a plurality of impedance elements and a plurality of switches,
wherein said plurality of switches are operable to be in a closed state or an open state,
wherein each of said plurality of switches are electrically connected to a respective one of said plurality of parasitic radiating elements,
wherein each of said plurality of switches are additionally connected to a respective one of said plurality of impedance elements,
wherein in the closed state, each of said plurality of switches are operable to electrically connect a respective one of said plurality of parasitic radiating elements to a respective one of said plurality of impedance elements, and
wherein in the open state, each of said plurality of switches are operable to electrically disconnect a respective one of said plurality of parasitic radiating elements to a respective one of said plurality of impedance elements.

9. The communication system of claim 1, wherein said electrically steerable parasitic array transmitter antenna comprises a feed radiating element and a plurality of parasitic radiating elements disposed in a near field of said feed radiating element.

10. The communication system of claim 9,
wherein said electrically steerable parasitic array transmitter antenna further comprises a plurality of impedance elements and a plurality of switches,
wherein said plurality of switches are operable to be in a closed state or an open state,
wherein each of said plurality of switches are electrically connected to a respective one of said plurality of parasitic radiating elements,
wherein each of said plurality of switches are additionally connected to a respective one of said plurality of impedance elements, wherein in the closed state, each of said plurality of switches are operable to electrically connect a respective one of said plurality of parasitic radiating elements to a respective one of said plurality of impedance elements, and wherein in the open state, each of said plurality of switches are operable to electrically disconnect a respective one of said plurality of parasitic radiating elements to a respective one of said plurality of impedance elements.

11. A communication method comprising:

providing, at a first time from a transmitter driver to an electrically steerable parasitic array transmitter antenna, a first transmitter driving signal so as to enable the electrically steerable parasitic array transmitter antenna to transmit a first electromagnetic field as a first transmitted beam having a first directional vector;

providing, at a second time from the transmitter driver to the electrically steerable parasitic array transmitter antenna, a second transmitter driving signal so as to enable the electrically steerable parasitic array transmitter antenna to transmit a second electromagnetic field as a second transmitted beam having a second directional vector;

providing, at a third time from a receiver driver to an electrically steerable parasitic array receiver antenna, a first receiver driving signal so as to enable the electrically steerable parasitic array receiver antenna to receive the first electromagnetic field as the first transmitted beam having the first directional vector; and providing, at a fourth time from the receiver driver to the electrically steerable parasitic array receiver antenna, a second receiver driving signal so as to enable the electrically steerable parasitic array receiver antenna to receive the second electromagnetic field as the second transmitted beam having the second directional vector.

12. The communication method of claim 11, further comprising:

providing, at an $n^{th}$ time from the transmitter driver to the electrically steerable parasitic array transmitter antenna, an $n^{th}$ transmitter driving signal so as to enable the electrically steerable parasitic array transmitter antenna to transmit a $n^{th}$ electromagnetic field as a $n^{th}$ transmitted beam having a $n^{th}$ directional vector;

providing, at a $m^{th}$ time from the receiver driver to the electrically steerable parasitic array receiver antenna, an $m^{th}$ receiver driving signal so as to enable the electrically steerable parasitic array receiver antenna to receive a $k^{th}$ electromagnetic field as a $k^{th}$ transmitted beam having a $k^{th}$ directional vector, wherein n is a positive integer, wherein m is a positive integer, wherein n<m, wherein k is a positive integer, and wherein k≤n.

13. The communication method of claim 12, wherein n=4, wherein m=0, and wherein k=0.

14. The communication method of claim 13, wherein said providing, at a first time from a transmitter driver to an electrically steerable parasitic array transmitter antenna, a first transmitter driving signal comprises providing the first transmitter driving signal as a signal modulated with a binary phase-shift keying modulation scheme.

15. The communication method of claim 14, wherein said providing, at a first time from a transmitter driver to an electrically steerable parasitic array transmitter antenna, a first transmitter driving signal comprises providing the first transmitter driving signal from the transmitter driver to the electrically steerable parasitic array transmitter antenna including a feed radiating element and a plurality of parasitic radiating elements disposed in a near field of the feed radiating element.

16. The communication method of claim 15, wherein said providing, at a first time from a transmitter driver to an electrically steerable parasitic array transmitter antenna, a first transmitter driving signal comprises providing the first transmitter driving signal from the transmitter driver to the electrically steerable parasitic array transmitter antenna further including a plurality of impedance elements and a plurality of switches, wherein the plurality of switches are operable to be in a closed state or an open state, wherein each of the plurality of switches are electrically connected to a respective one of the plurality of parasitic radiating elements, wherein each of the plurality of switches are additionally connected to a respective one of the plurality of impedance elements, wherein in the closed state, each of the plurality of switches are operable to electrically connect a respective one of the plurality of parasitic radiating elements to a respective one of the plurality of impedance elements, and wherein in the open state, each of the plurality of switches are operable to electrically disconnect a respective one of the plurality of parasitic radiating elements to a respective one of the plurality of impedance elements.

17. The communication method of claim 11, wherein said providing, at a first time from a transmitter driver to an electrically steerable parasitic array transmitter antenna, a first transmitter driving signal comprises providing the first transmitter driving signal as a signal modulated with a binary phase-shift keying modulation scheme.

18. The communication method of claim 17, wherein said providing, at a first time from a transmitter driver to an electrically steerable parasitic array transmitter antenna, a first transmitter driving signal comprises providing the first transmitter driving signal from the transmitter driver to the electrically steerable parasitic array transmitter antenna including a feed radiating element and a plurality of parasitic radiating elements disposed in a near field of the feed radiating element.

19. The communication method of claim 18, wherein said providing, at a first time from a transmitter driver to an electrically steerable parasitic array transmitter antenna, a first transmitter driving signal comprises providing the first transmitter driving signal from the transmitter driver to the electrically steerable parasitic array transmitter antenna further including a plurality of impedance elements and a plurality of switches, wherein the plurality of switches are operable to be in a closed state or an open state, wherein each of the plurality of switches are electrically connected to a respective one of the plurality of parasitic radiating elements, wherein each of the plurality of switches are additionally connected to a respective one of the plurality of impedance elements, wherein in the closed state, each of the plurality of switches are operable to electrically connect a respective one of the plurality of parasitic radiating elements to a respective one of the plurality of impedance elements, and wherein in the open state, each of the plurality of switches are operable to electrically disconnect a respective one of the plurality of parasitic radiating elements to a respective one of the plurality of impedance elements.

20. A non-transitory, tangible, computer-readable media having computer-readable instructions stored thereon, the computer-readable instructions being capable of being read by a computer and being capable of instructing the computer to perform the method comprising:

providing, at a first time from a transmitter driver to an electrically steerable parasitic array transmitter antenna, a first transmitter driving signal so as to enable the electrically steerable parasitic array transmitter antenna to transmit a first electromagnetic field as a first transmitted beam having a first directional vector;

providing, at a second time from the transmitter driver to the electrically steerable parasitic array transmitter antenna, a second transmitter driving signal so as to enable the electrically steerable parasitic array transmitter antenna to transmit a second electromagnetic field as a second transmitted beam having a second directional vector;

providing, at a third time from a receiver driver to an electrically steerable parasitic array receiver antenna, a first receiver driving signal so as to enable the electrically steerable parasitic array receiver antenna to receive the first electromagnetic field as the first transmitted beam having the first directional vector; and providing, at a fourth time from the receiver driver to the electrically steerable parasitic array receiver antenna, a second receiver driving signal so as to enable the electrically steerable parasitic array receiver antenna to receive the second electromagnetic field as the second transmitted beam having the second directional vector.

* * * * *